(12) United States Patent
Oh et al.

(10) Patent No.: US 7,230,373 B2
(45) Date of Patent: Jun. 12, 2007

(54) FIELD EMISSION TYPE BACKLIGHT DEVICE

(75) Inventors: Tae-sik Oh, Suwon-si (KR); Jong-min Kim, Suwon-si (KR); Jae-eun Jung, Seoul (KR); Jung-woo Kim, Yongin-si (KR); Hang-woo Lee, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 214 days.

(21) Appl. No.: 11/048,738

(22) Filed: Feb. 3, 2005

(65) Prior Publication Data

US 2005/0179380 A1 Aug. 18, 2005

(30) Foreign Application Priority Data

Feb. 3, 2004 (KR) .................. 10-2004-0006949

(51) Int. Cl.
*H01J 1/02* (2006.01)
*H01J 19/24* (2006.01)

(52) U.S. Cl. .................. 313/497; 313/309; 313/336; 313/351; 313/311

(58) Field of Classification Search ........ 313/495–497, 313/309, 336, 351, 311, 346 R
See application file for complete search history.

(56) References Cited

U.S. PATENT DOCUMENTS 6,121,942 A * 9/2000 Sanou et al. ............... 345/75.1
2001/0024085 A1* 9/2001 Abe et al. .................. 313/495

* cited by examiner

*Primary Examiner*—Ashok Patel
(74) *Attorney, Agent, or Firm*—H. C. Park & Associates, PLC

(57) ABSTRACT

A field emission type backlight device can include upper and lower substrates facing each other with a gap between them, an anode electrode on a lower side of the upper substrate, a fluorescent layer on a lower side of the anode electrode, a lower gate electrode on an upper side of the lower substrate, an insulating layer on an upper side of the lower gate electrode, a cathode electrode on an upper side of the insulating layer, and a gate electrode that is provided on an upper side of the insulating layer and electrically connected to the lower gate electrode.

9 Claims, 5 Drawing Sheets

FIELD EMISSION TYPE BACKLIGHT DEVICE

BACKGROUND OF THE INVENTION

This application claims priority to Korean Patent Application No. 10-2004-0006949, filed on Feb. 3, 2004, which is incorporated herein in its entirety by reference.

1. Field of the Invention

The present invention relates to a field emission type backlight device. More particularly, it relates to a field emission type backlight device capable that may have improved luminance uniformity and reduced power consumption.

2. Description of the Related Art

Liquid crystal displays (LCDs) often require a backlight device. A cold cathode fluorescent lamp (CCFL) has been commonly used as a line light source, and a light emitting diode (LED) as a point light source. More recently, field emission devices are being explored as alternative light sources. A field emission type backlight device has low power consumption and a relatively uniform luminance even in a wide area of light emission.

FIG. 1A is a sectional view showing a conventional field emission type backlight device. FIG. 1B is a plan view showing a cathode electrode on a lower substrate.

Upper and lower substrates 20 and 10 face each other, separated by a gap. An anode electrode 22 and a fluorescent layer 24 are sequentially provided on a lower side of the upper substrate 20. On an upper side of the lower substrate 10 a cathode electrode 12 is provided as an electron emission source. In a field emission type backlight device having such a structure, electrons are emitted from the cathode electrode 12 when a voltage is applied between the anode electrode 22 and the cathode electrode 12. When the electrons collide against the fluorescent layer 24, it radiates visible light.

In such a backlight device, an example of which is shown in FIG. 1B, the cathode electrode 12 is provided on the entire surface of the lower substrate 10. In such a structure, luminance uniformity tends to decrease if the cathode electrode 12 is not uniform in thickness. Also, non-uniform emission tends to occur due to concentration of electric field in the edge of the cathode electrode 12.

FIGS. 2A and 2B depict a field emission device designed to solve the problems with the device shown in FIGS. 1A and 1B. FIG. 2A is a sectional view showing a field emission type backlight device. FIG. 2B is a plan view showing a cathode electrode and a gate electrode on a lower substrate.

Upper and lower substrates 40 and 30 are disposed to face each other with a predetermined gap therebetween. An anode electrode 42 and a fluorescent layer 44 are sequentially provided on a lower side of the upper substrate 40. Line-shaped cathode electrodes 32 and gate electrodes 33 are alternatively provided on an upper side of the lower substrate 30.

In such a device, since cathode electrodes 32 are connected to each other in series and gate electrodes 33 are connected to each other in series, resistance between beginning and end portions of the signal voltage line connecting the electrodes may be large. In addition, the bigger the display, the larger the resistance between beginning and end portions of the signal voltage line. This can lead to differences in input voltage and delay in signal pulse. This may cause luminance difference between beginning and end portions of the signal voltage line.

Moreover, capacitance varies depending on the gap between the cathode and gate electrodes 32 and 33, and capacitance increases greatly as the gap between the cathode and gate electrodes 32 and 33 narrows. The gap may be narrowed to improve current characteristic by dropping the operating voltage. Power consumption increases as line resistance and capacitance grow larger.

SUMMARY OF THE INVENTION

The present invention provides a field emission type backlight device capable of improving luminance uniformity and reducing power consumption.

The present invention provides, for example, a field emission type backlight device including upper and lower substrates facing each other with a gap between them, an anode electrode on a lower side of the upper substrate, a fluorescent layer on a lower side of the anode electrode, a lower gate electrode on an upper side of the lower substrate, an insulating layer on an upper side of the lower gate electrode, a cathode electrode on an upper side of the insulating layer, and a gate electrode provided on an upper side of the insulating layer and electrically connected to the lower gate electrode.

DETAILED DESCRIPTION OF THE INVENTION

Exemplary embodiments of a field emission type backlight device of the present invention will now be described in detail with reference to the accompanying drawings.

Figure 1A:
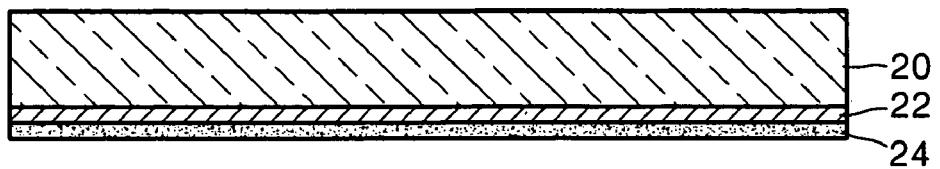
FIG. 1A is a sectional view showing a conventional field emission type backlight device.
Figure 1A:
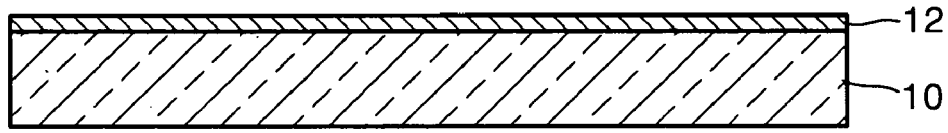
Figure 1B:
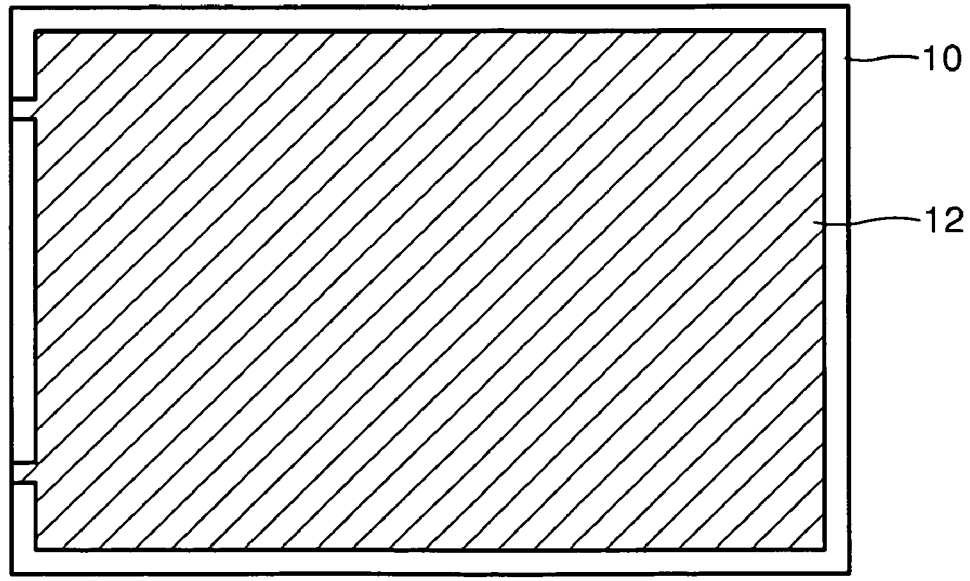
FIG. 1B is a plan view of the device of FIG. 1A.
Figure 2A:
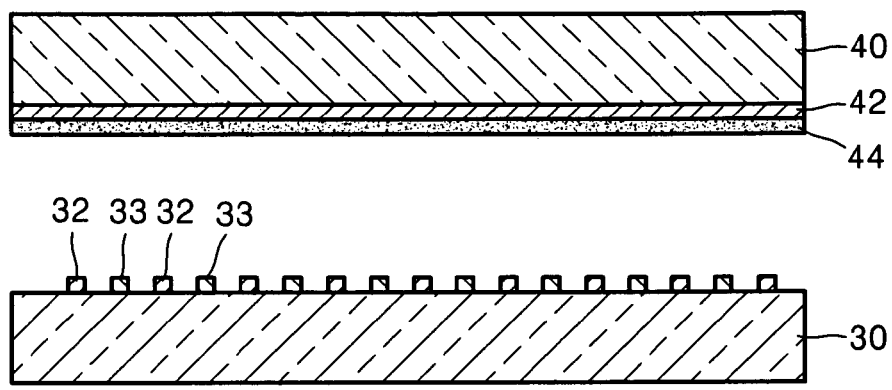
FIG. 2A is a sectional view showing another conventional field emission type backlight device.
Figure 2B:
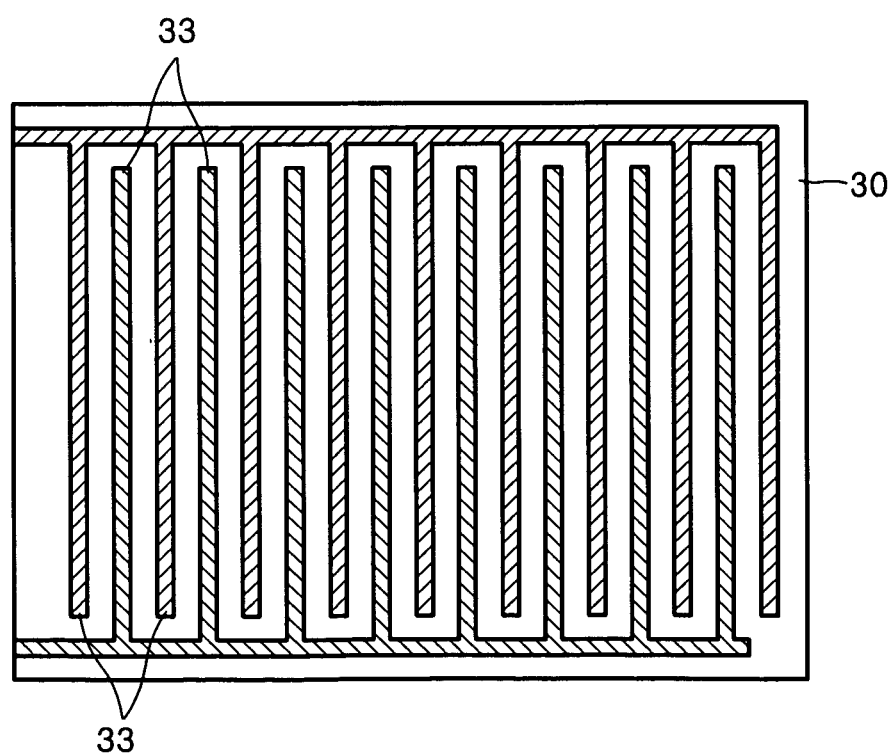
FIG. 2B is a plan view of the device of FIG. 2A.
Figure 3A:
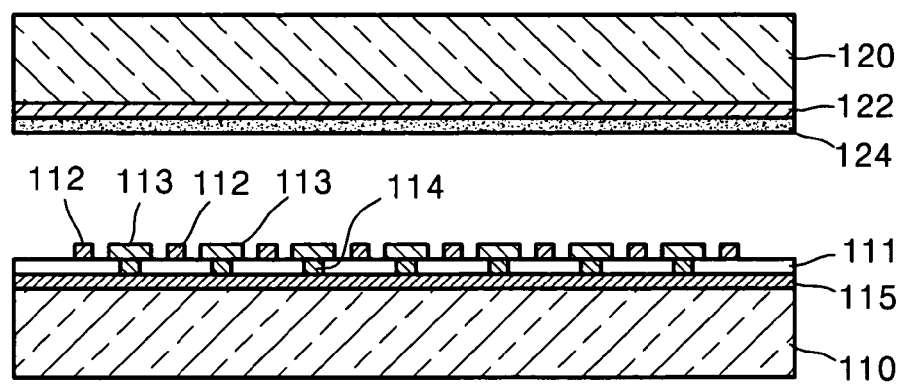
FIG. 3A is a sectional view showing a field emission type backlight device of an embodiment of the present invention.
Figure 3B:
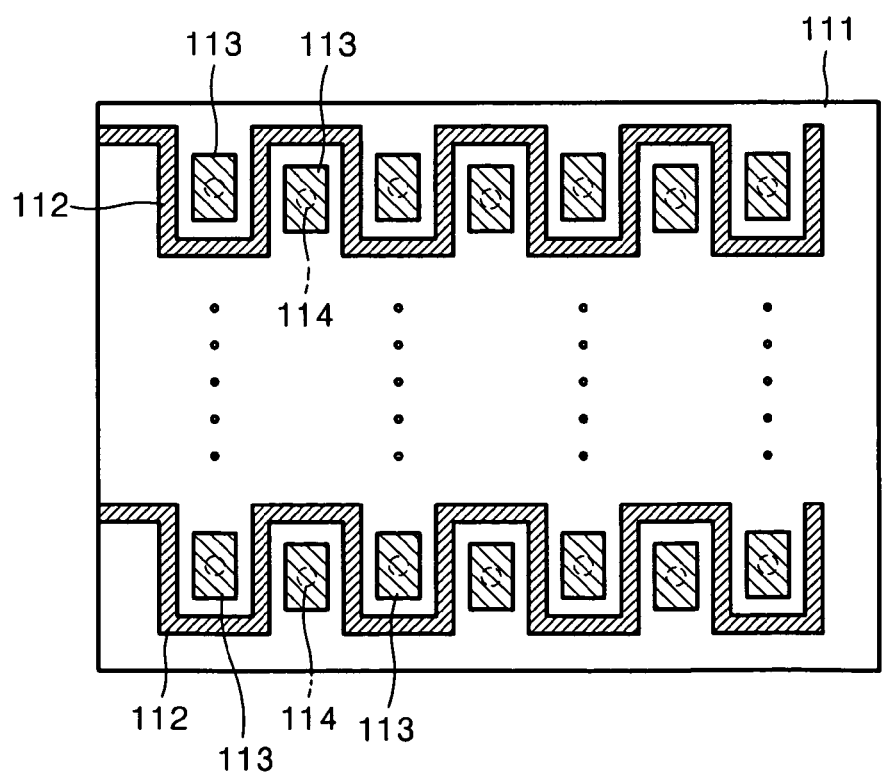
FIG. 3B is a plan view of the device of FIG. 3A.

As shown in FIGS. 3A and 3B, upper and lower substrates 120 and 10 may be disposed facing each other with a gap between them. The upper and lower substrates 120 and 110 may be made of a transparent substrate such as glass substrate.

An anode electrode 122 may be provided on a lower side of the upper substrate 120. A fluorescent layer 124 may be provided on a lower side of the anode electrode 122. The anode electrode 122 may be provided on the entire surface of the upper substrate 120 and the fluorescent layer 124 may be provided on the entire surface of the anode electrode 122.

A lower gate electrode 115 may be provided on an upper side of the lower substrate 110, and an insulating layer 111 may be provided on an upper side of the lower gate electrode 115. A cathode electrode 112 and a plurality of gate electrodes 113 may be provided on an upper side of the insulating layer 111.

The lower gate electrode 115 may be provided on the entire surface of the lower substrate 110. The lower gate electrode 115 may be electrically connected to the gate electrodes 113 with an insulating layer 111 between them. The insulating layer 111 may be provided on the entire surface of the lower gate electrode 115 in a thick film. Such a thick film insulating layer 111 functions to prevent capacitance from increasing. A plurality of via holes 114 for electrically connecting the lower gate electrode 115 and the gate electrodes 113 may be provided in the insulating layer 111.

The cathode electrode 112 (which may serve as an electron emission source) may be provided in a square-waved shape on an upper side of the insulating layer 111. When the cathode electrode 112 is provided in such a shape, luminance can be improved because an electron emission area may be enlarged. A plurality of cathode electrodes 112 can be provided on an upper side of the insulating layer 111 as shown in FIG. 3B. The cathode electrode 112 may include a material capable of improving electron emission such as nanocarbon material. The nanocarbon material may be, for example, carbon nanotube (CNT), diamond, or fullerene.

The gate electrodes 113 may be disposed inside the square-waved shape of the cathode electrode 112. Such gate electrodes 113, as described above, may be electrically connected to the lower gate electrode 115 on an upper side of the lower substrate 110 through the via hole 114.

If a positive voltage of dozens of volts is applied to the lower gate electrode 115, approximately the same voltage may be applied to the gate electrodes 113 on the insulating layer 111 electrically connected to the lower gate electrode 115. If a negative voltage of dozens of volts is applied to the square-waved cathode electrode 112, electrons may be emitted from the cathode electrode 112.

If a plurality of the square-waved cathode electrodes 112 are provided on an upper side of the insulating layer 111, it may be possible to sequentially turn on the cathode electrodes 112. It may therefore be possible to adjust the duty ratio.

If the cathode electrode 112 is provided in a square-waved shape and the gate electrodes 113 are disposed inside the square-waved shape of the cathode electrode 112, it may be possible to improve luminance due to increase in electron emission area. If the duty ratio is adjusted by sequentially turning on a plurality of cathode electrodes 112, it may be possible to reduce instantaneous current flowing in the display. It may therefore be possible to reduce load and power consumption on the circuit.

Figure 4A:
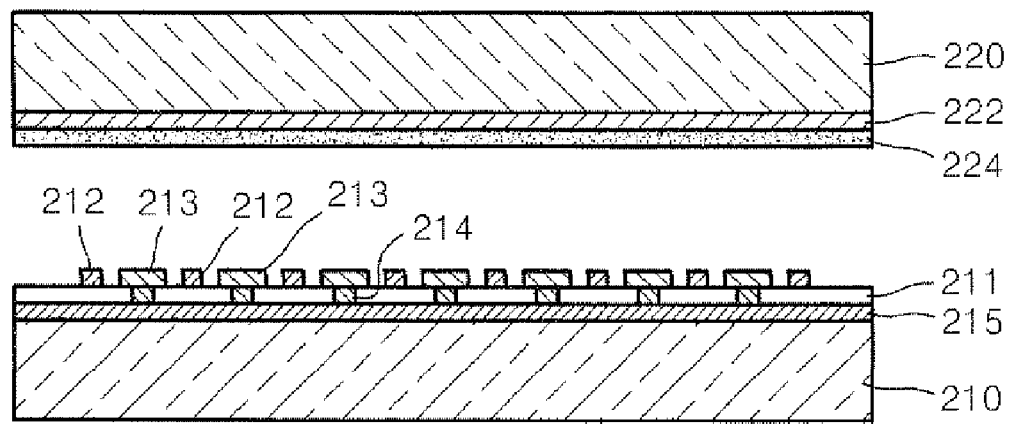
FIG. 4A is a sectional view showing a field emission type backlight device of another embodiment of the present invention.
Figure 4B:
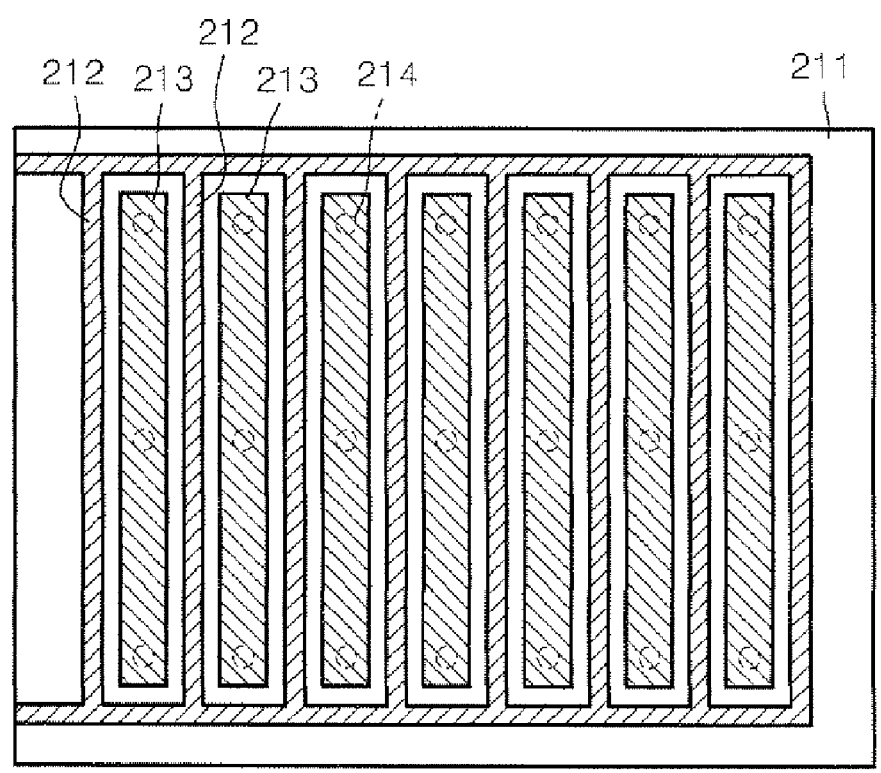
FIG. 4B is a plan view of the device of FIG. 4A.

Another embodiment is shown in FIGS. 4A and 4B. As shown in FIGS. 4A and 4B, upper and lower substrates 220 and 210 may face each other with a gap between them. An anode electrode 222 may be provided on a lower side of the upper substrate 220. A fluorescent layer 224 may be provided on a lower side of the anode electrode 222.

A lower gate electrode 215 is provided on an upper side of the lower substrate 210, and an insulating layer 211 is provided on an upper side of the lower gate electrode 215 in a thick film. The lower gate electrode 215 and the insulating layer 211 may be provided on the entire surface of the lower substrate 210 and the lower gate electrode 215, respectively. A plurality of via holes 214 for electrically connecting the lower gate electrode 215 and the gate electrodes 213 may be provided in the insulating layer 211.

A plurality of cathode electrodes 212 and gate electrodes 213 may be provided on an upper side of the insulating layer 211. The cathode electrodes 212 are provided to be is connected to each other in parallel as shown in FIG. 4B. The cathode electrodes 212 may include a nanocarbon material such as carbon nanotube (CNT), diamond, or fullerene. The gate electrodes 213 are provided between cathode electrodes 212. Each of the gate electrodes 213 is electrically connected to the lower gate electrode 215 through the via hole 214 on the insulating layer 211.

When the cathode electrodes 212 are connected to each other in parallel and the gate electrodes 213 are disposed between the cathode electrodes 212, it is possible to markedly reduce resistance difference between cathode electrodes. It is therefore possible to improve luminance uniformity all over the screen.

Figure 5A:
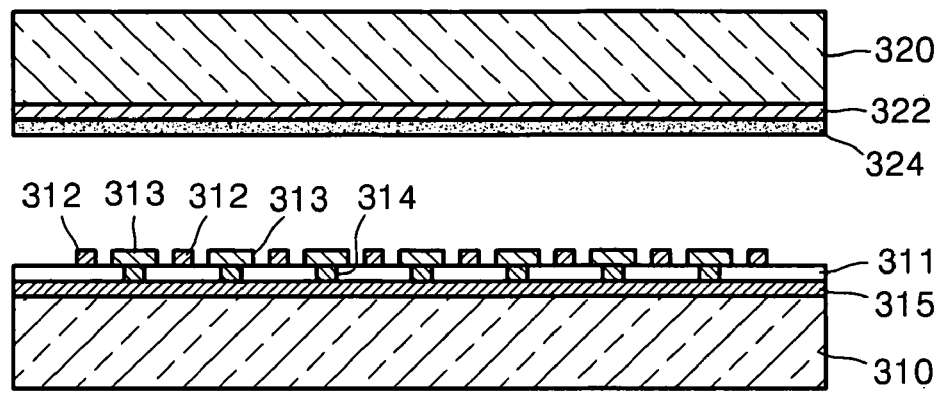
FIG. 5A is a sectional view showing a field emission type backlight device of yet another embodiment of the present invention.
Figure 5B:
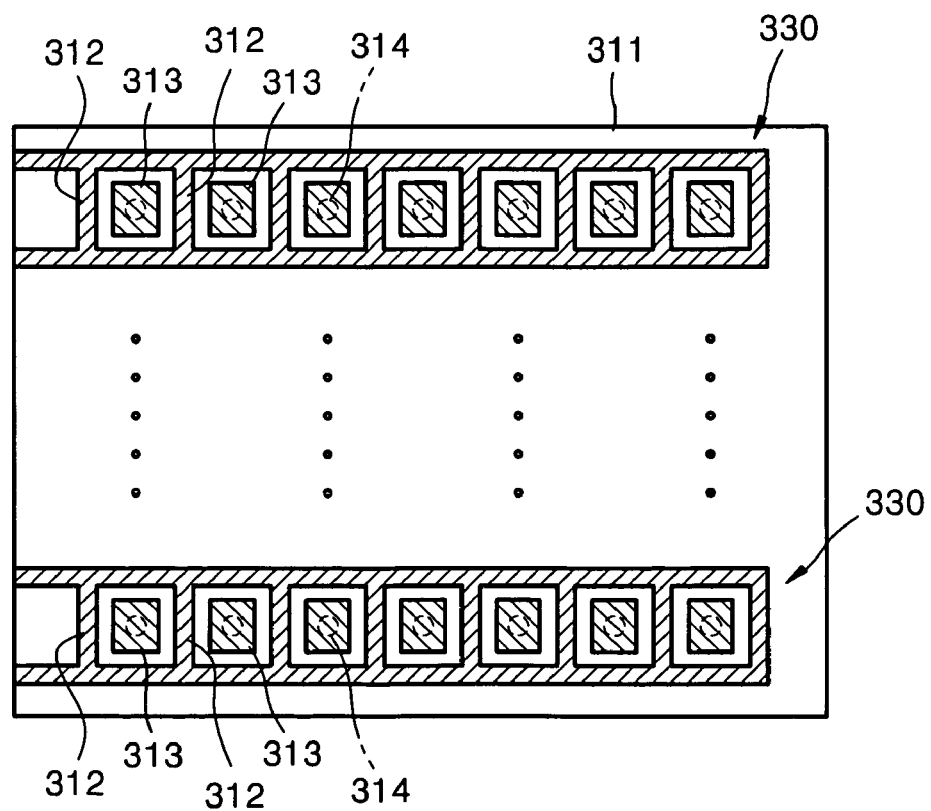
FIG. 5B is a plan view of the device of FIG. 5A.

FIGS. 5A and 5B illustrate yet another embodiment of the present invention. As shown in FIGS. 5A and 5B, an anode electrode 322 may be provided on a lower side of an upper substrate 320. A fluorescent layer 324 may be provided on a lower side of the anode electrode 322. A lower gate electrode 315 may be provided on an upper side of the lower substrate 310. An insulating layer 311 may be provided on an upper side of the lower gate electrode 315 in a thick film.

A plurality of units 330 that each comprise a plurality of cathode electrodes 312 and gate electrodes 313 may be provided on an upper side of the insulating layer 311. The cathode electrodes 312 of units 330 may be connected to each other in parallel and the gate electrodes 313 may be disposed within the cathode electrodes 312. Each of the gate electrodes 313 may be electrically connected to the lower gate electrode 315 through one of the via holes 314 on the insulating layer 311.

If there are a plurality of units 330 that each comprise cathode electrodes 312 connected to each other in parallel and the gate electrodes 313 disposed between the cathode electrodes 312, it may be possible to improve luminance due to increase in electron emission area. In addition, it may be possible to adjust the duty ratio by sequentially turning on the cathode electrodes 312. Accordingly, it may be possible to reduce load and power consumption on a circuit since it may be possible to reduce instantaneous current flowing to the display.

Additionally, it may be possible to markedly reduce resistance difference between the cathode electrodes by connecting the cathode electrodes 312 of units 330 to each other in parallel. It may therefore be possible to improve luminance uniformity all over the display.

A field emission type backlight device of the present invention may have the following advantages. It may be possible to avoid increasing capacitance by forming a thick film insulating layer on an upper side of an lower gate electrode. It may be possible to improve luminance by increasing the electron emission area. It may be possible to improve luminance uniformity all over the display since it may be possible to markedly reduce resistance difference between cathode electrodes by connecting cathode electrodes to each other in parallel. It may also be possible to adjust the duty ratio by sequentially turning on the cathode electrodes. Accordingly, it may be possible to reduce load and power consumption on a circuit since it may be possible to reduce instantaneous current flowing in the display.

While exemplary embodiments of the present invention have been described, they are illustrative and various changes may be made without departing from the scope of the present invention.

What is claimed is:

1. A field emission type backlight device, comprising:
   a lower gate electrode on a lower substrate;
   an insulating layer on the lower gate electrode;
   a cathode electrode on the insulating layer; and
   a gate electrode on the insulating layer and electrically coupled to the lower gate electrode.

2. The field emission type backlight device of claim 1, wherein the lower gate electrode is provided on substantially entire surface of the lower substrate.

3. The field emission type backlight device of claim 1, further comprising a via hole for electrically coupling the lower gate electrode and the gate electrode.

4. The field emission type backlight device of claim 1, wherein the cathode electrode comprises a nanocarbon material.

5. The field emission type backlight device of claim 4, wherein the nanocarbon material comprises a material selected from a group of carbon nanotube (CNT), diamond, and fullerene.

6. The field emission type backlight device of claim 1, wherein the cathode electrode comprises a square-wave shape.

7. The field emission type backlight device of claim 1, further comprising a plurality of cathode electrodes on an upper side of the insulating layer and connected to each other in parallel; and a plurality of gate electrodes on an upper side of the insulating layer, disposed between the cathode electrodes.

8. The field emission type backlight device of claim 7, further comprising a plurality of units each of which comprises the cathode electrodes and the gate electrodes.

9. The field emission type backlight device of claim 7, wherein the cathode electrodes are turned on in sequence.

* * * * *